United States Patent [19]
Brown

[11] Patent Number: 5,900,097
[45] Date of Patent: May 4, 1999

[54] METHOD OF FABRICATING A LAMINATED COMPOSITE MATERIAL

[76] Inventor: Dennis P. Brown, 1125 Dlong Rd., Apt. F, Catonsville, Md. 21228

[21] Appl. No.: 08/739,790

[22] Filed: Oct. 30, 1996

[51] Int. Cl.⁶ .......................... B32B 31/18; B32B 31/20; C03C 27/00
[52] U.S. Cl. .................. 156/264; 156/89.11; 156/89.28; 156/227; 264/642; 264/DIG. 36; 264/DIG. 57; 65/59.1; 228/903
[58] Field of Search ................ 156/89, 227, 257, 156/264, 89.11, 89.28; 264/642, DIG. 36, DIG. 57; 65/59.1; 228/903; 428/621, 627, 629, 630, 632, 635

[56] References Cited

U.S. PATENT DOCUMENTS

| | | |
|---|---|---|
| 2,287,598 | 6/1942 | Brown . |
| 2,424,353 | 7/1947 | Essig . |
| 3,074,143 | 1/1963 | Smith . |
| 3,328,145 | 6/1967 | McMillan et al. . |
| 3,414,963 | 12/1968 | Cheng ..................... 156/89 X |
| 3,479,168 | 11/1969 | Bird et al. . |
| 3,592,942 | 7/1971 | Hauck et al. . |
| 3,616,115 | 10/1971 | Klimmek . |
| 3,719,551 | 3/1973 | Radtke et al. . |
| 3,993,411 | 11/1976 | Babcock et al. ............. 228/903 X |
| 3,994,430 | 11/1976 | Cusano et al. ............. 228/903 X |
| 4,050,956 | 9/1977 | De Bruin et al. ............ 156/89 X |
| 4,172,107 | 10/1979 | Nakamura et al. ............ 156/89 |
| 4,406,722 | 9/1983 | Chow et al. ............. 156/89 |
| 4,470,537 | 9/1984 | Diem et al. ............ 228/903 X |
| 4,483,810 | 11/1984 | Bunk et al. ............. 156/89 |
| 4,530,884 | 7/1985 | Erickson et al. . |
| 4,591,401 | 5/1986 | Neidig et al. ............. 156/89 |
| 4,693,409 | 9/1987 | Mizunoya et al. ............ 228/903 X |
| 4,725,333 | 2/1988 | Leedecke et al. . |
| 4,764,089 | 8/1988 | Strangman . |
| 4,954,386 | 9/1990 | Mizunoya et al. . |
| 5,074,941 | 12/1991 | Sass et al. ............. 156/89 |
| 5,120,377 | 6/1992 | Morohashi et al. . |
| 5,153,077 | 10/1992 | Kishiba et al. . |
| 5,252,550 | 10/1993 | Yamauchi et al. . |
| 5,304,602 | 4/1994 | Yamamoto et al. . |
| 5,350,637 | 9/1994 | Ketcham et al. . |
| 5,439,879 | 8/1995 | Salama et al. ............. 156/89 X |
| 5,443,917 | 8/1995 | Tarry . |
| 5,543,130 | 8/1996 | Tsuno et al. . |
| 5,601,932 | 2/1997 | Krum et al. . |
| 5,707,715 | 1/1998 | DeRochemont et al. . |
| 5,776,593 | 7/1998 | Massa et al. . |

*Primary Examiner*—Curtis Mayes
*Attorney, Agent, or Firm*—Rosenberg, Klein & Bilker

[57] ABSTRACT

There is provided a method of fabricating a laminated composite material and laminated composite materials fabricated thereby wherein the method includes the initial step of forming a pre-laminate by overlaying a first layer characterized by a first thermal expansion coefficient and a first ductility parameter with a second layer characterized by a second thermal expansion coefficient and a second ductility parameter. The pre-laminate is heated to a temperature at which the first ductility parameter becomes substantially equivalent in value to the second ductility parameter. The first and second layers of the heated prelaminate are then pressed together, preferably by use of a rolling mill technique, with sufficient compression force to cause the layers to adhere one to the other, thus forming a core laminate. Preferably, the core laminate is divided, either by cutting or folding, into a plurality of divided laminate members. One of the divided laminate members is overlaid onto the other of the divided laminate members to form a laminate stack. The temperature of the laminate stack is then controlled to substantially equalize the first and second ductility parameters in each of the divided laminate members of the laminate stack. The divided laminate members of the laminate stack are then pressed together, preferably by use of a rolling mill technique.

16 Claims, 4 Drawing Sheets

METHOD OF FABRICATING A LAMINATED COMPOSITE MATERIAL

BACKGROUND OF THE INVENTION

FIELD OF THE INVENTION

The subject method of fabricating laminated composite materials and materials fabricated thereby generally relate to structural materials having high resistance to material failure under tension. More specifically, the method of fabricating laminated composite materials combines a ceramic composition and a metallic composition into a laminate exhibiting the high strengths generally characteristic of ceramics and the toughness generally characteristic of metals.

The use of ceramics as structural materials is well-known. It is well recognized that ceramics, when free of material faults such as scratches and cracks, generally exhibit great strength. Typically, a ceramic such as silicate glass, in its pure, fault-free form exhibits a yield strength of nearly 3600 $MPa/m^2$. Considering that most metals exhibit yield strengths no greater than 2000 $MPa/m^2$, the use of ceramics particularly for high stress structural applications holds much promise.

The yield strength of ceramics, however, is heavily dependent on the absence of faults in the material. Moreover, ceramics generally are quite vulnerable to the formation upon impact of cracks and even more vulnerable to the propagation therethrough of such cracks, once they are formed. That is, while ceramics do exhibit great yield strength, they also exhibit extremely low fracture toughness and toughness. Compared to the 100–350 $MPa/m^2$ and 100–1000 $kJ/m^2$ fracture toughness and toughness values seen typically in most metals, ceramics such as silicate glass exhibit fracture toughness and toughness values of only 0.7 $MPa/m^2$ and 0.01 $kJ/m^2$. Thus, the great yield strengths ideally realizable with ceramics are, in practice, extremely difficult to actually realize, given their inherent susceptibility to fracture formation.

The use of metals in structural materials is, obviously, also well-known. While metals generally do exhibit much greater fracture toughness and toughness compared to ceramics, as mentioned above; they simply do not exhibit a great enough yield strength to be useful in many high stress structural applications. Most metals which exhibit strengths in the upper regions of the yield ranges, are typically specialized metal alloys which, in most cases, may be obtained only at high cost.

Another factor limiting the use of metals in extremely high stress applications, aside from their limited yield strengths, is their weight density. In many applications, the high weight density of metals is a tolerable, though undesirable, trade-off factor. In many high performance applications, however, the high density of such metals is not tolerable, even if the strength offered by the metal were acceptable. Thus, structural materials which exhibit at least the overall toughness and yield strengths of metals, yet do not exhibit the high weight densities of metals would be a highly desirable feature in most structural applications and is found to be necessary in many higher performance applications.

Efforts have been made in the past to augment the desirable properties realized in a structural material by combining layers of similar or dissimilar compositions into a structural laminate. For instance, ancient metallurgical processing techniques included the folding of metallic sheets into multi-layered structures. This technique tended to yield materials having increased tensile strength (compared to the tensile strength of any individual folded sheet), but was plagued in its simplicity by the inability to effect true, consistent layering and to maintain across each layer uniformity of thickness and material composition. This made precise control of the resulting material's final bulk properties virtually impossible.

Another metallurgical processing technique employed in the past was the simultaneous rolling of dissimilar metallic sheets stacked together. This technique has traditionally been confronted with a number of significant problems arising from the simple mechanical rolling of, invariably, complex composites. Among these problems which, to this day, have not been sufficiently overcome in employing this technique, are differential thermal expansions of the constituent metals, insufficient interlayer bonding, non-uniformity in the plastic flow of the layers, and cross diffusion among the layers. A significant by-product of these problems is a practically unavoidable non-uniformity in the resulting laminate material's thickness or width which necessarily diminishes the quality, salability, stress repeatability, and consistency of the bulk structural properties realized in the laminate material. What is more, the ever-present weight density problem of metals is not addressed by this technique.

A concept that has emerged more recently is that of combining layers of metal and ceramic to form composite laminated structures commonly referred to as laminated "Cermets." The potential to concurrently realize in such structures a material having desirable structural properties of both metals and ceramics, yet having a tremendously high strength-to-weight ratio, has spurred extensive study and developmental effort. Numerous techniques for forming laminated Cermets have developed as a result, including: powder sintering, electrolytic growth, vapor deposition, plasma spraying, and mechanical stacking and pressing. These techniques have in various respects proven inherently ineffective and inefficient, such that the mass production of laminated Cermets at any useful level has yet to be realized. These techniques have also failed to yield any Cermet panels of sufficiently great surface area to prove useful in commercial applications. Hence, these existing techniques find severely limited, if any, utility where useful forms of Cermet materials are to be generated within realistic cost constraints.

PRIOR ART

Composite laminate materials having a metallic layer and a ceramic layer, and various methods for fabricating such materials are known in the art. The best prior art known to Applicant includes U.S. Pat. Nos. 5,350,637; 4,725,333; 2,287,598; 3,479,168; 3,719,551; 3,074,143; 3,328,145; 4,530,884; 5,304,602; 5,252,550; 3,616,115; 3,592,942; 5,443,917; 4,764,089; 5,120,377; and, 2,424,353. Such known materials and fabrication methods, however, fail to disclose a process whereby a multi-layered composite material having at least one ceramic-containing layer that is workable and, thus, may be formed by employing a rolling mill technique. The known methods, moreover, do not disclose a method of fabricating a composite laminate which exhibits the level of strength and toughness exhibited by the laminated composite materials formed in accordance with the present invention. Nor do they disclose a method of fabricating a composite laminate which resists crack formation as do the laminated composite materials formed in accordance with the present invention.

For instance, U.S. Pat. No. 5,350,637 is directed to microlaminated composites and methods. While that reference does disclose a method for fabricating a laminate having a ceramic constituent as well as a metallic constituent, it certainly does not produce, nor is it intended to produce, a composite laminate of high strength and toughness which is also workable. The process certainly does not produce a composite laminate which may be freely rolled as in the subject Patent. Indeed, the process disclosed in this reference is intended quite specifically to produce a well-bonded laminate without having to apply high pressures. What pressures the disclosed process employs are of a nature and degree provided by a pressing technique and certainly not a rolling mill technique.

The difference in this regard is significant. Extremely high compression pressures necessary for many industrial applications are obtainable with pressing techniques only in machines of proportionately great dimension and mass. Such demanding requirements in dimension and mass make the application of the pressing technique to form laminates of anything greater than nominal dimension quite impractical. The rolling mill technique, on the other hand, offers much greater degrees of pressures between its rollers at a relatively low cost in equipment dimension and mass. The workability of a given material in a rolling mill process, therefore, expands tremendously the potential industrial utility of that material.

Referring again to the method and microlaminated composites disclosed in the '637 Patent, such composites also do not exploit the structural benefits obtainable by use of thermal expansion coefficient mismatch between adjacent layers of different composition. The static compression found in intermediate layers of the subject laminated composite material are not seen in these microlaminated composites. The disclosed method of forming these microlaminated composites, in fact, prescribe the interlacing of ceramic strips with metallic strips, or in the alternative, a weaving of such strips. The crossing of ceramic-metal boundaries in either case would tend to destructively interfere with whatever degree of static compression might be generated by differential thermal expansion along any given ceramic-metal boundary.

SUMMARY OF THE INVENTION

In view of the extraordinary benefits which may be obtained from Cermet materials in useful forms, there is a significant need for a practicable method of forming such useful forms of Cermet materials. It is therefore a primary object of the present invention to provide a simple method for mass producing multi-layered composite laminate materials which generally exhibit the advantageous structural properties that typically characterize metals and ceramics.

It is another object of the present invention to provide multi-layered composite laminate materials having the yield strength typically characteristic of ceramics and the fracture toughness and toughness typically characteristic of metals yet having a high strength-to-weight ratio.

It is another object of the present invention to provide a method for fabricating multi-layered composite laminate materials combining the advantageous structural properties typically characteristic of metals and ceramics wherein a simple rolling mill technique is employed.

It is another object of the present invention to provide a method for fabricating multi-layered composite laminate materials by employing an iterative rolling mill technique wherein a rolled laminate material is folded and re-rolled with each iteration.

It is another object of the present invention to provide a method for fabricating a multi-layered composite laminate material having at least one layer including a metallic composition and at least one layer including a ceramic composition.

It is another object of the invention to provide a method for fabricating a ceramic/metal composite laminate material wherein the ductility of a metallic layer and the viscosity of a ceramic layer are substantially equalized such that the mechanical working properties of the respective layers are substantially identical.

It is a further object of the subject invention to provide a method for fabricating multi-layered composite laminate materials where the strain rate deformation of the metal phase is matched to the strain rate deformation of the glass or ceramic phase.

Another object of the instant invention is to provide a method for fabricating multi-layered composite laminate materials where the strain rate of the metal phase is a parameter used to control the viscosity of the metal phase independent of temperature.

It is another object of the present invention to provide a method of fabricating multi-layered composite laminate materials having at least one substantially metallic layer and at least one substantially adjacent ceramic layer wherein the flow characteristics of the composite laminate material may be modified by varying the composition of one or more of the layers.

It is another object of the present invention to provide a method for fabricating multi-layered composite laminate materials having at least one layer including a ceramic composition and at least one layer including a metallic composition wherein one of said layers includes a structure modifying composition that alters the ductility or viscosity of the metallic or ceramic composition in the given layer.

It is another object of the present invention to provide a method of fabricating a multi-layered composite laminate material having at least one layer including a nonductile ceramic composition and at least one layer including a ductile ceramic composition.

It is another object of the present invention to provide a method of fabricating a multi-layered composite laminate material having at least one layer including a glass polymer composition and at least one layer including a ceramic composition.

It is another object of the invention to provide a method of fabricating a multi-layered composite laminate material having at least one substantially metallic layer and at least one substantially ceramic layer which is resistant to microcrack formation.

It is another object of the present invention to provide a method of fabricating a multi-layered composite laminate material having an extremely high yield strength yet is highly resistant to impact-caused failure.

It is another object of the present invention to provide a multi-layered composite laminate material having at least one layer including a ceramic composition wherein a ceramic composition-containing layer is in static compression due to the difference in its thermal expansion properties relative to that of its adjacent layers leading to an increased ceramic strength and fracture toughness.

These and other objects are attained in the subject method of fabricating laminated composite materials and materials fabricated thereby.

The subject method includes the steps of forming a pre-laminate by overlaying a first layer characterized by a first coefficient of thermal expansion and a first ductility parameter with a second layer characterized by a second coefficient of thermal expansion and a second ductility parameter; heating the pre-laminate to a predetermined working temperature, the temperature at which the first ductility parameter becomes substantially equivalent in value to the second ductility parameter; and, pressing together the first and second layers of the heated pre-laminate by applying thereto a predetermined compression force sufficient to cause those layers of the heated pre-laminate to adhere one to the other and thereby form a core laminate.

The method further includes in the preferred embodiments the steps of dividing the core laminate, by either cutting or folding, into a plurality of divided laminate members, each including a portion of the core laminates first layer and a portion of the core laminates second layer; forming a laminate stack by overlaying at least one of those divided laminate members with another; controlling the temperature of the laminate stack to reach a predetermined compensated temperature at which the first ductility parameter of that portion of the first core laminate contained in each divided laminate member of the laminate stack becomes substantially equivalent in value to the second ductility parameter of that portion of the core laminate second layer contained therein; and, pressing together the stacked divided laminate members of the laminate stack by applying a predetermined compression force thereto so that the stacked divided laminate members are caused to adhere one to the other. Preferably, the first layer of the core laminate includes a metallic composition, and the second layer of the core laminate includes a ceramic composition. The second coefficient of thermal expansion is also preferably less than the first coefficient of thermal expansion such that when a second layer is sandwiched between and covalently bonded in the resulting laminated composite material to a pair of first layers, the sandwiched second layer has induced therein by the pair of metallic layers covalently bonded thereto a predetermined compressive tensile stress.

DESCRIPTION OF THE PREFERRED EMBODIMENTS

Figure 1A:
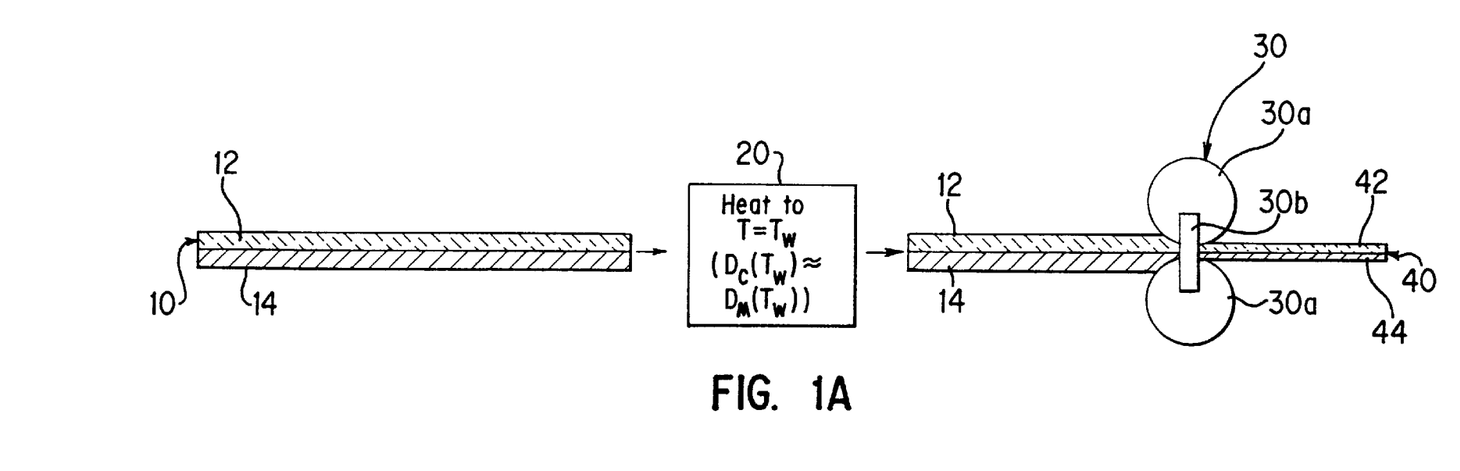
FIG. 1A is a functional diagram illustrating a first iterative step in a preferred embodiment of the subject method of fabricating laminated composite materials.
Figure 1B:
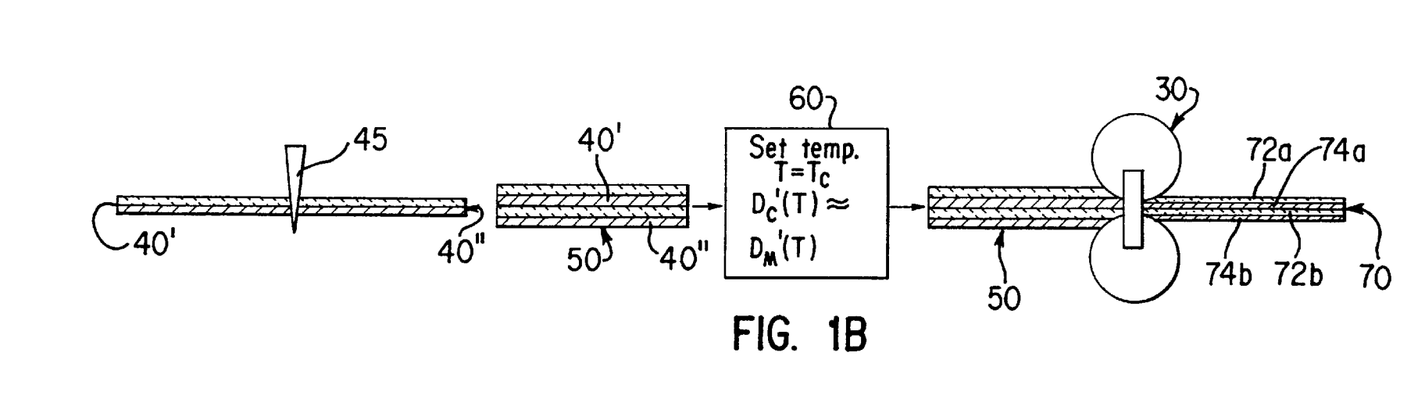
FIG. 1B is a functional diagram illustrating a second iterative step in the preferred embodiment of the subject method of fabricating laminated composite materials shown in FIG. 1A.

Turning now to FIGS. 1A–1B, there is shown a diagram illustrating a preferred embodiment of the subject method of fabricating laminated composite materials. Preferably, a ceramic sheet 12 and a metallic sheet 14 are stacked to form a pre-laminate 10. The particular choice of ceramic and metallic compositions chosen for sheets 12 and 14 is dictated by metallurgical properties of the sheets 12 and 14. Two important considerations bear on this choice of compositions. Initially, it is important that the ceramic and metal compositions chosen, be respectively characterized by thermal expansion properties which are similar, though not precisely equal, at the temperature ranges within which the composite laminate material formed by the subject method will ultimately be utilized. In addition to the reasons discussed in following paragraphs, this similarity in thermal expansion properties is necessary to insure that the resulting laminated structure does not delaminate as a result of significantly different thermal expansions of adjacent layers, thereby destroying the structural integrity of the resulting product.

A second important consideration is the relative ductility characteristics of the two compositions of sheets 12 and 14. It is important that the two compositions exhibit substantially equivalent ductilities at the temperature at which the two sheets are to be rolled to form a laminate structure. Such equivalence in ductility facilitates, among other things, the realization of consistent laminate thickness and substantially uniform spreading as the sheets 12 and 14 are compressed during a rolling process. The occurrence of overlap or cross-fusion between non-adjacent layers in the resulting composite laminate material is thereby avoided.

The significance of these two considerations in selecting the ceramic and metallic compositions to be paired in pre-laminate 10 is increasingly accentuated as the number of ceramic and metallic layers to be ultimately realized in the resulting composite laminate material is increased. As will be discussed in following paragraphs, composite laminate materials having the number of layers on the order of thousands are contemplated. Thus, it is important that the paired compositions be carefully selected in view of their thermal expansion and ductility characteristics.

The basis of matching the ductile flow of the metal to the viscous flow of ceramic or glass is seen from:

$$\delta = G\frac{(de)^m}{(dt)} \tag{1}$$

where:
 $\delta$=flow stress
 G=constant dependent on particular metal
 de/dt=strain rate response of the particular metal
 M=constant related to work hardening of metal Wherever the terms ductile response or flow is herein used, such relates to the metal's strain rate response to an applied force as follows from Equation 1. Thus, it is the strain rate or ductility of the metal which is made to match the viscous flow of the glass or ceramic phase during the rolling process which creates the overall composite laminate.

Figure 2:
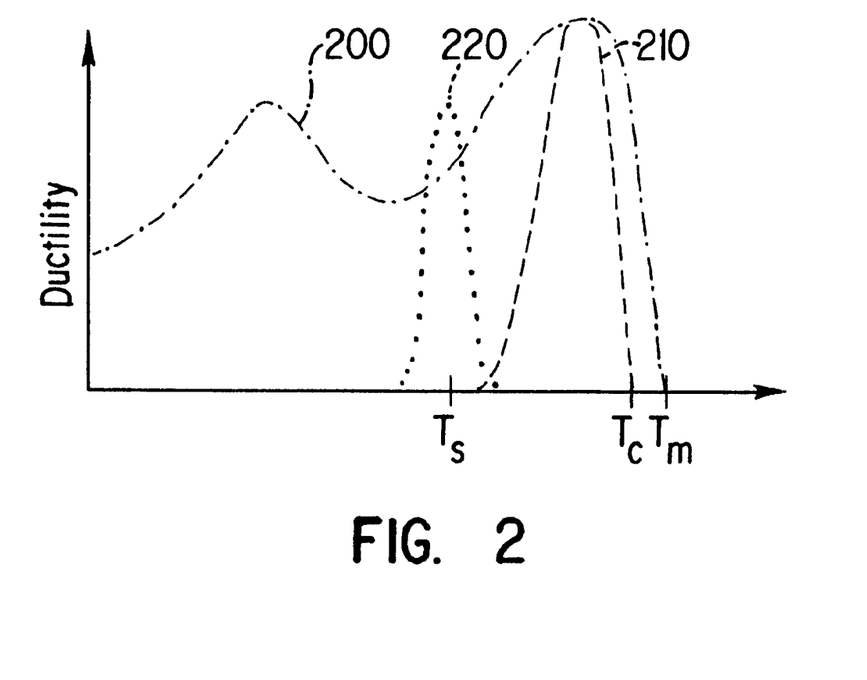
FIG. 2 is an exemplary graph illustrating the variance of the ductility exhibited in materials as the temperatures of those materials are varied.

Since the strain rate of a metal is substantially equivalent to a viscous flow of the metal, the ductile flow, that is the strain rate or the metal's viscous flow may be used to control the metal's viscous response and the overall rolling process. This control is possible since the viscous or ductile response of a metal is relatively insensitive to temperature (when compared to glass) but is Sensitive to strain rate (as shown in FIG. 2). However, glass or ceramic viscous flow is relatively independent of strain rate (when compared to metal), but is dependent on temperature. Thus by controlling the strain rate of the laminate during a rolling process, the metal's viscosity, ductility or strain rate may be substantially independently controlled from that of the glass or ceramic's viscous response.

Turning back to the steps illustrated in FIG. 1A, pre-laminate 10 is heated as indicated at step 20 to a working temperature $T_W$. Working temperature $T_W$ is determined by the particular compositions chosen for sheets 12 and 14 of pre-laminate 10; however, it universally represents the temperature at which both the ceramic and metal compositions of layers 12 and 14 are within their plastic stages respectively in their characteristic stress-strain diagrams in tension. Working temperature $T_W$ further represents the temperature at which those stress-strain diagrams and tension characteristic of the ceramic and metallic compositions of sheets 12 and 14 cross one another; that is, the point at which their respective ductilities are substantially equivalent.

All solid materials are characterized by a ductility, typically defined as the ability of the material in its plastic range to deform without breaking and is measured either in terms of percentage elongation wherein:

$$D_e = \frac{100(L_b - L_0)}{L_o} \quad (2)$$

where:
$D_e$=percentage of elongation
$L_b$=gage length after rupture (cm.)
$L_o$=original gage length before testing (cm.) or
in terms of percentage reduction in cross-sectional area wherein:

$$D_a = \frac{100(A_0 - A_b)}{A_0} \quad (3)$$

where:
$D_a$=percentage of reduction of cross-sectional area
$A_o$=original cross-sectional area
$A_b$=cross-sectional area at the section of rupture Ductilities of materials are generally quite highly dependent on temperature, and the characteristic ductility of given materials may be plotted relative to temperature, as shown in FIG. 2. A ductility temperature range within which the material exhibits some degree of ductility as it transitions from its solid to its liquid states. The ductile range for a typical metal is shown by curve 200 which indicates that a metal generally exhibit a degree of ductility at temperatures up to its melting point temperature $T_M$. Ceramics, on the other hand, as shown by curve 210, do not exhibit a substantial ductility until approximately 8/10ths of its melting point temperature, or $T_C$, is reached. Beyond 0.8 $T_C$, the ductility of ceramics generally reaches a maximum, then decreases as the material transitions into its liquid phase at $T_C$.

Referring back to step 20 of FIG. 1A, the working temperature $T_W$ is chosen to be at least 0.8 $T_C$ and preferably chosen such that the ductility of the ceramic material $D_C$ ($T_W$) is substantially equivalent to the ductility of the metal, $D_M$ ($T_W$) at that temperature.

The heating of pre-laminate 10 to the working temperature $T_W$ has the effect not only of matching the respective ductilities of sheets 12 and 14, it also facilitates in the bonding. Covalent bonding materials such as metal tend to resist bonding with similar materials. Metals, however, tend to form on their outer surfaces oxides with which ceramic materials tend to quite readily bond. The heating of pre-laminate 10 facilitates this covalent bonding as the enhanced ductility of the two layers 12 and 14 tends to enhance the conformity of their interfacing surfaces.

The heated pre-laminate 10 is passed through a roller assembly 30 having a suitable arrangement of horizontal rollers 30a, 30a and one or more vertical rollers 30b. The particular configuration of the roller assembly is not important to the present invention, and such may be any one of numerous suitable roller assemblies known in the prior art.

The heated pre-laminate 10 is then passed through the roller assembly suitably configured and adjusted to form a core laminate 40 of desired thickness and planar dimensions. With the compositions of layers 12 and 14 properly selected and concurrently heated to the proper working temperature $T_W$ in accordance with the present invention, the layers 12 and 14 of the heated pre-laminate 10 are virtually identical in their workabilities, and substantial uniformity in the thickness and planar dimensions of the core laminate bonded layers 42, 44 are maintained across substantially all portions of core laminate 40. In the absence of matched workabilities of layers 12, 14, such uniform, consistent layering would be extremely difficult to obtain with a simple rolling process.

The number of layers of the composite laminate resulting from this process may be increased, as shown in FIG. 1B, by cutting with cutting tool 45, or by folding the resulting core laminate 40 to form two or more divided laminate members 40', 40" and essentially repeating the steps shown in FIG. 1A. Accordingly, divided laminate members 40', 40" are stacked, overlaying the top planar surface of one with the bottom planar surface of the other, to form a laminate stack 50. The temperature of this laminate stack is controlled, if necessary, at step 60 to again equalize the ductilities of the ceramic and metal layers $D_C$(T), $D_M$(T), in divided laminate members 40', 40" of laminate stack 50. Laminate stack 50 is then passed through the suitably-adjusted roller assembly 30 to form the next stage laminate 70 having bonded ceramic and metal layers 72a, 72b, 74a, 74b. This next stage laminate 70 may again be cut, stacked, temperature-adjusted, and rolled to further expand the number of layers in the resulting composite laminate. This process may be repeated for as many iterations as necessary for a given application.

Note that in temperature control step 60, appropriate controls may be necessary to actually reduce the temperature T of laminate stack 50 to a compensated temperature $T_C$ which is different from the working temperature $T_W$ of step 20 in FIG. 1A. This compensation in working temperature is necessary where work hardening that is often seen in metals occurs in the metallic layers of the divided laminate members 40', 40".

Given that ceramic compositions do not work harden, such work hardening in the metallic layers ultimately disturbs the equivalence of the ceramic/metal ductilities obtained at $T_W$. A slight mismatch in the relative ductilities of the layers causes inconsistent flows in the layers in various directions, and delineation of distinct layers, much less consistent and dimensionally-uniform layers, cannot be obtained. By precisely controlling the temperature of laminate stack 50, however, the workabilities of the distinct layers may again be substantially equalized.

Turning now to a specific example of a laminated composite material fabricated in accordance with the present invention, one such material is formed by the composite lamination of silicate glass and steel layers. Silicate glass is a class of ceramic materials which, technically speaking, never assumes a solid state. Rather, the amorphous material assumes at sufficiently low temperatures, a brittle vitreous state wherein its viscous flow is sufficiently low that it exhibits physical properties typically attributed to solids.

When its temperature is raised, silicate glass transitions from its brittle vitreous state to a plastic state at a glass transition temperature, its viscous flow at that point becoming high enough to allow the material to exhibit a workability indistinguishable from ductility seen in solids. Thus, silicate glass has associated therewith an effective ductility range, as shown by curve 220 in FIG. 2 which reaches a peak ductility, then declines as it reaches its molten state with a continued increase in temperature. The working point temperature for silicate glass is preferably chosen to be the temperature $T_S$ at which the glass attains its peak ductility.

Figure 3:
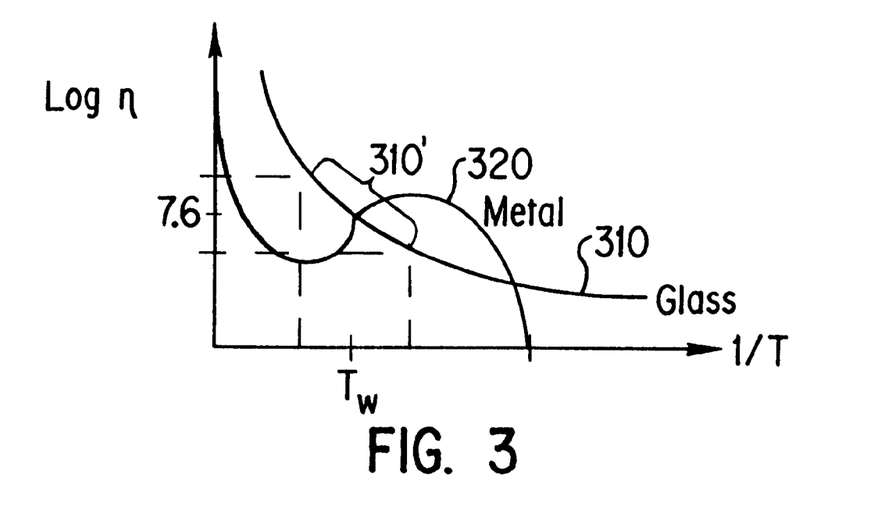
FIG. 3 is an exemplary graph illustrating the variance of effective ductility for selective materials as the inverse of temperature for those materials varies.

Turning now to FIG. 3, while it is preferable to set the working temperature at $T_S$, the point of peak viscosity or effective ductility of the glass, the working temperature may actually be set at any point corresponding to the working range illustrated for glass by the segment 310' of the curve 310 for glass, so long as the ductility of the given steel layers (curve 320) matches the effective ductility of the silicate glass at the temperature within the working range so selected. The curves 310, 320 of FIG. 3 plot against the inverse of temperature, the viscosity or effective ductility defined as follows:

$$\text{Log } \eta = B/T - A \quad (4)$$

where: $\eta$=viscosity coefficient,

A and B are imperical constants

T is the instantaneous temperature of the given material in Kelvins.

Typical values for constants A and B are shown for various silicate glass compositions are shown in Table 1.

TABLE 1

| GLASS TYPE | A | B |
|---|---|---|
| Fused Silica | 6.9 | 28,200 |
| 96% Silica | 2.9 | 18,800 |
| Borosilicate | 5.0 | 13,900 |
| Soda-Lime | 4.6 | 11,200 |
| Lead | 3.9 | 10,100 |

Silicate glasses are typically characterized by a workability temperature range of 500° C.—for a corresponding viscosity range centered about 7.6, as shown in FIG. 3. Within these temperature ranges, steel has a ductility, or comparable effective viscosity of approximately $5 \times 10^7$ to $5 \times 10^{10}$ poise (log $\eta$=7.6 to 10.6, approximately). The temperature corresponding to the point at which curve 320 crosses curve 310 within this temperature range, $T_W$, is selected as the working or rolling temperature of prelaminate 10 in FIG. 1A.

In FIG. 3, the effective viscosity plotted for the given steel composition by curve 320 is obtained by the following analysis. As is $\eta$, the viscosity coefficient characteristic of glass compositions, the sheer modulus, G, which indicates the response of a given metal to plastic flow effective therein is temperature dependent. Those skilled in the art will recognize that given the analogous nature of the parameters G and $\eta$, an effective viscosity measure is indicated for the given metal within the glass working temperature ranges simply by the sheer modulus G of that metal. The sheer modulus G may be readily deduced from a simple hardness measurement at a given temperature.

Turning now to the fracture toughness property, the ceramic layers in composite laminated materials formed in accordance with the present invention generally exhibit a much greater fracture toughness than it would otherwise exhibit. Silicate glass, for instance, typically exhibits a fracture toughness of only 0.01 kJ/m$^2$. If it is compressively stressed by, for example, a stress of approximately 400 MPa/m$^2$, the same silicate glass exhibits a fracture toughness of approximately 20 kJ/m$^2$. The preferred embodiment of the present invention exploits this phenomenon by effecting such a compressive stress on ceramic layers sandwiched between and covalently bonded between a pair of metallic layers.

Figure 4A:
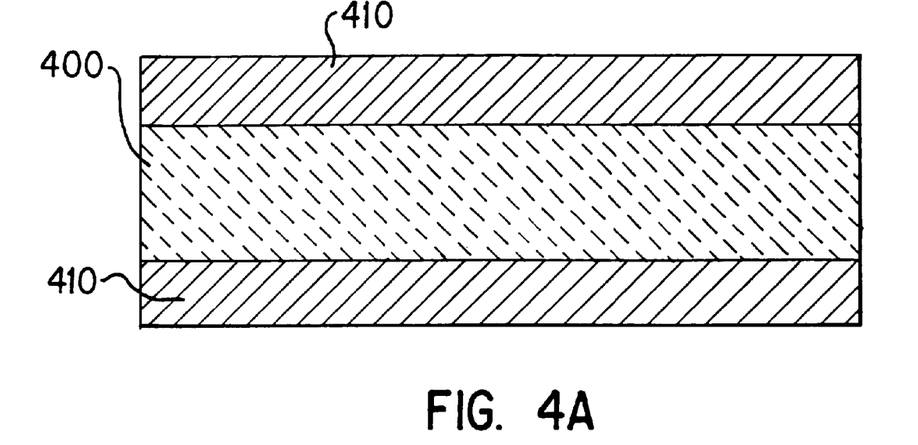
FIG. 4A is an illustrative diagram showing the static compressive stress due to differential thermal expansion generated in an intermediate ceramic layer bounded by adjacent metallic layers.
Figure 4B:
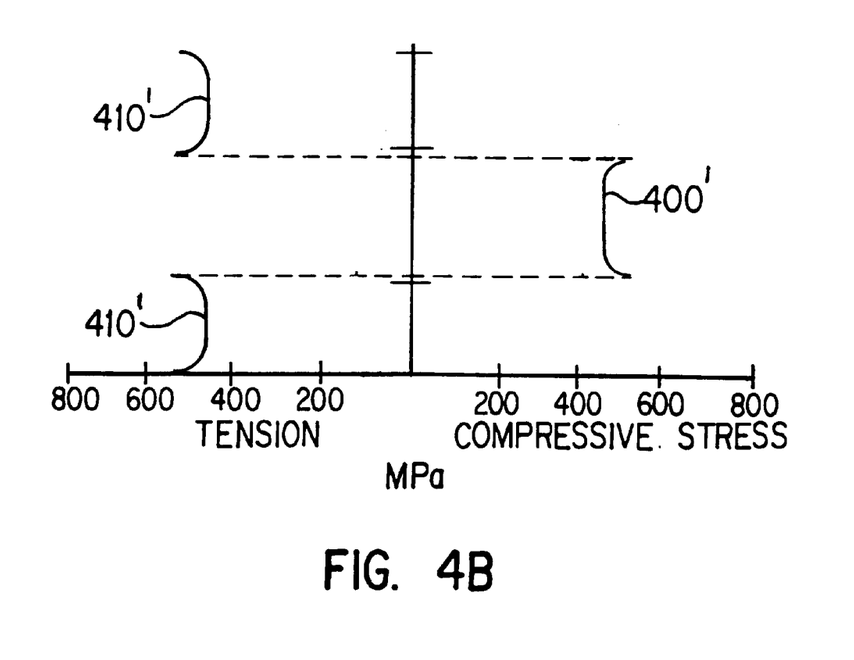
FIG. 4B is an illustrative diagram mapping typical stress forces produced within a glass/steel composite laminate material by use of differential thermal expansion concept.

The compositions of the metallic and ceramic layers employed are characterized by similar, but not identical, coefficients of thermal expansion. The ceramic layer composition is preferably selected such that its coefficient of thermal expansion is less than that of the metallic layer composition. Thus, when a composite laminate material formed in accordance with the present invention is allowed to cool, the thermal expansion differentials between bonded ceramic and metallic layers cause the metallic layers to be placed in states of tension which place on the ceramic layer a compressive stress. This is illustrated in FIG. 4A showing a composite laminated layer structure including silicate glass 400 sandwiched between steel layers 410. A typical map of stress forces within a glass/steel composite laminate material is also shown in FIG. 4B curve 400' illustrating the compressive stress forces pertaining to glass layer 400 and curves 410' representing the tension forces pertaining to the steel layers 410.

In the resulting structure, not only will the metallic layers protect the sandwiched glass layer from contact with abrasive or chemically harmful agents, they will serve both as energy absorbers for enabling the ceramic layer to withstand greater impact loads without suffering crack damage and serve as a protective buffer for arresting propagation of any cracks that may have formed in the ceramic layer itself. On the other hand, the high yield strength of the ceramic layers enhances the resistance in the resulting laminate to creep.

Figure 5A:
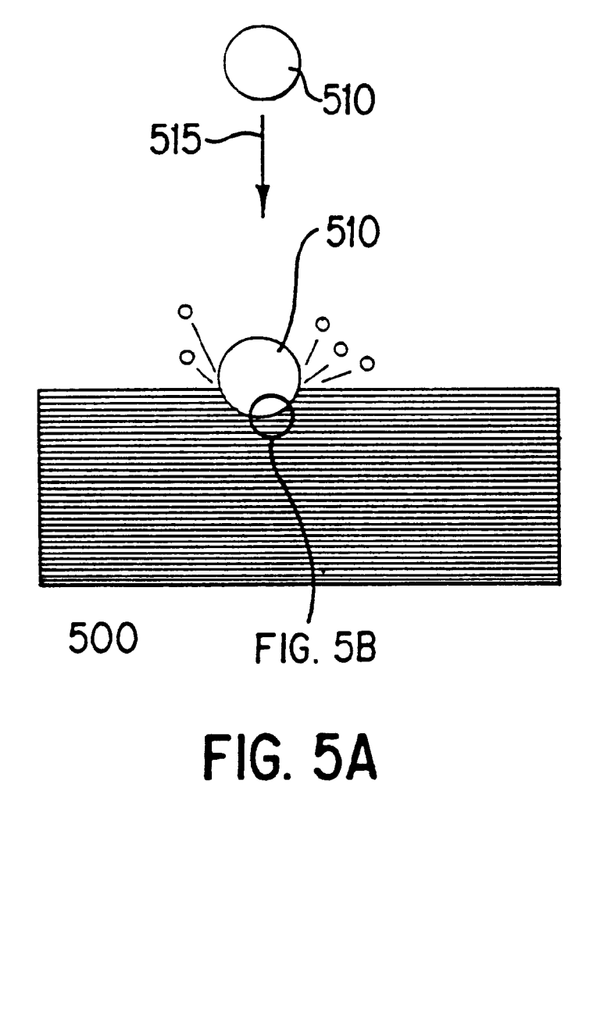
FIG. 5A is an illustrative diagram showing an impact test formed on a composite laminate material formed in accordance with the present invention; and, FIG. 5B is an illustrative diagram showing a detailed view of the portion of the composite laminate material indicated in FIG. 5A.
Figure 5B:
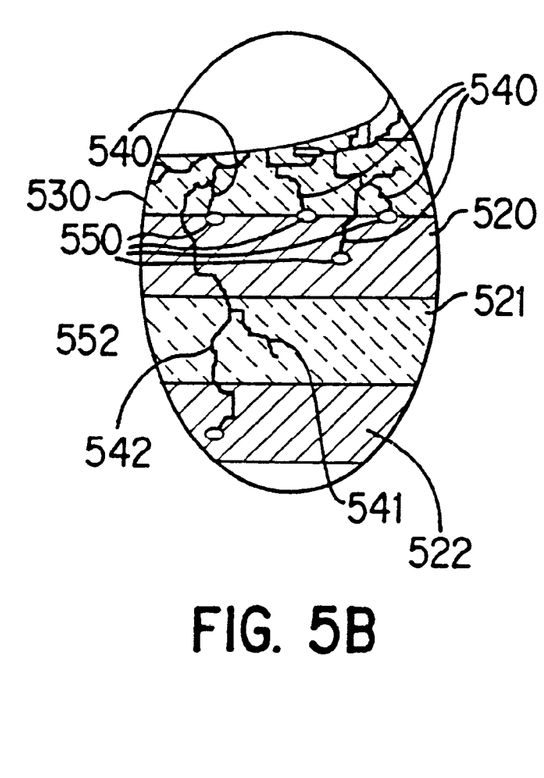

The results of a test for characterizing these attributes are illustrated in FIGS. 5A and 5B. As there illustrated, a composite laminate stack 500 formed in accordance with the present invention with N layers was subjected to impact by a steel test ball 510 ballistically projected at the planar surface of its outermost laminate layer along a direction 515. Analysis of the damage resulting in the layers of laminate 500 indicated that the very first metallic layer beneath the area of greatest structural penetration of the ball 510 effectively stopped the great majority of cracks 540 formed by the impact through the immediately preceding ceramic layer 520, as shown by the crack stoppage points 550. Of the few penetrating cracks 541 that extended past the metallic layer 520, some were stopped presumably by the compressive strengthening thereof at the immediately following ceramic layer 521. Those cracks 542 extending beyond ceramic layer 521 were stopped at crack stoppage points 552 within the very next metallic layer 522.

Experimentation with various laminate materials formed in accordance with the present invention yielded superior strength and toughness properties when compared with other structural materials not so formed in accordance with the present invention. Two composite laminate materials tested were glass/steel and titanium/alumina laminates. The glass/steel laminate material employed borosilicate glass having a thermal coefficient of expansion of approximately $9.1 \times 10^{-6}$ with a high strength steel composition having a thermal expansion coefficient of approximately $12.1 \times 10^{-6}$ at a working temperature of approximately 715° C. The titanium/alumina laminate employed titanium alloys having a typical characteristic yield strength of approximately 750 MPa/m² and a melting point temperature of 1940° C., and alumina ($Al_3O_5$) having a compressive yield strength of approximately 5000 MPa/m². As alumina begins to exhibit true plastic properties at temperatures above approximately 1100° C., a working temperature of at least 1100° C. is preferably selected for this laminate. A comparative summary of the yield strength, $\sigma_{YS}$, the yield strength-to-density ratio, $\sigma_{YS}/\rho$, and the density, $\rho$, pertaining to each of these laminate materials as well as to other various materials is shown in Table 2.

TABLE 2

| MATERIAL | $\rho$ (Mg/m³) | $\sigma_{YS}$ (MPa/m²) | $\sigma_{YS}/\rho$ |
|---|---|---|---|
| Al* | 2.7 | 350 | 130 |
| Mg* | 1.7 | 150 | 88 |
| Ti* | 4.5 | 750 | 167 |
| Steel | 7.9 | 1000 | 127 |
| Glass/Steel Laminate | 5.2 | 1150 | 221 |
| Ti/Alumina Laminate | 4.2 | 1450 | 345 |

Note that the density of the laminate materials formed in accordance with the present invention may obviously be varied by adjusting the volume of constituent compositions therein. In the typical laminate materials included in Table 2, however, the glass/steel laminate exhibited an average density of 5.2 Mg/m³ which when compared with the density of steel of 7.9 Mg/m³, represented a 33% reduction in overall density. This reduction in actual weight density resulted in an even more impressive 74% increase in the strength-to-density ratio.

In addition to the preferred embodiments discussed in preceding paragraphs, the present invention may be practiced in various forms of alternate embodiments. Those alternate embodiments include the following introducing dopants into surfaces of one or more of the constituent element layers to functionally enhance the interface of dissimilar materials. For instance, tantalum dopants may be introduced into the surfaces of titanium layers in the disclosed titanium/alumina laminate materials so as to strengthen the bonds between adjacent layers, or to modify the physical properties seen at the layer interfaces after the rolling process.

In another alternate embodiment, a third composition may be introduced in one or more of the laminate layers. This may introduce properties not attainable with only the other two laminate layer compositions, or otherwise complement the properties derived from those other two layer compositions.

In another alternate embodiment, a combination of ductile and non-ductile ceramic compositions are employed in place of the metallic composition. The resulting laminate structure which retains the improved fracture toughness not otherwise attainable with simple bulk ceramic materials, they enable the application of such laminates in radar-transparent, load-bearing structures or radar absorbing materials. For their application in radar absorbing materials, dipole absorbers may be introduced into one or more of the ceramic layers of the laminate material, or, in the alternative, selected ones of the layers may be substituted with layers of semi-conductor materials. In an example of such alternative embodiments, at least one of the laminate layers includes a glass polymer composition, and at least one of the other laminate layers includes a ceramic composition.

In yet another alternate embodiment, high strength metallic layers may be employed with layers of ultra-hard ceramics such as in tungsten/$Al_2O_3$ laminate materials. Such laminate materials could be employed in laminated armor applications.

Although this invention has been described in connection with specific forms and embodiments thereof, it will be appreciated that various modifications other than those discussed above may be resorted to without departing from the spirit or the scope of the invention. For example, functionally equivalent steps may be substituted for those specifically shown and described in relation to the fabrication method disclosed, various materials may be employed for the laminate layers combined in the fabrication of a composite laminate, and various structural and dimensional configurations may be effected in the composite laminate formed, all without departing from the spirit or scope of the invention as defined in the appended Claims.

What is claimed is:

1. A method of fabricating a laminated composite material comprising the steps of:

(a) overlaying a first layer with a second layer to form a pre-laminate, at least one of said first and second layers including a ceramic composition, said first layer being characterized by a first coefficient of thermal expansion and a first ductility parameter, said second layer being characterized by a second coefficient of thermal expansion and a second ductility parameter;

(b) heating said pre-laminate to a predetermined working temperature, said first ductility parameter being at said predetermined working temperature substantially equivalent in value to said second ductility parameter;

(c) pressing together said first and second layers of said heated pre-laminate by applying thereto a predetermined compression force, said predetermined compression force being sufficient to cause said first and second layers of said heated pre-laminate to adhere one to the other and thereby form a core laminate;

(d) cutting said core laminate to form a plurality of divided laminate members, each of said divided laminate members including a portion of said first layer of said core laminate and a portion of said second layer of said core laminate;

(e) stacking at least a pair of said divided laminate members to form a laminate stack;

(f) setting the temperature of said laminate stack to a predetermined compensated temperature, said first ductility parameter of said portion of said first layer contained in each said divided laminate member of said laminate stack being at said predetermined compensated temperature substantially equivalent in value to said second ductility parameter of said portion of said second layer contained therein; and, (g) pressing together said stacked divided laminate members of said laminate stack by applying thereto said predetermined compression force, whereby said stacked divided laminate members are caused to adhere one to the other.

2. The method of fabricating a laminated composite material as recited in claim 1 wherein said first layer includes a metallic composition.

3. The method of fabricating a laminated composite material as recited in claim 2 wherein said second coefficient of thermal expansion is less than said first coefficient of thermal expansion.

4. The method of fabricating a laminated composite material as recited in claim 2 wherein said second layer includes a silicate glass composition.

5. The method of fabricating a laminated composite material as recited in claim 2 wherein said second layer includes an alumina composition.

6. The method of fabricating a laminated composite material as recited in claim 2 wherein said predetermined compression force is applied by mechanical rolling means.

7. The method of fabricating a laminated composite material as recited in claim 1 wherein said first layer includes a ductile ceramic composition, and said second layer includes a non-ductile ceramic composition.

8. The method of fabricating a laminated composite material as recited in claim 1 wherein said first layer includes both a ductile and nonductile ceramic composition, and said second layer includes a nonductile ceramic composition.

9. The method of fabricating a laminated composite material as recited in claim 8 wherein said second layer is characterized by a lower coefficient of thermal expansion than said first layer.

10. The method of fabricating a laminated composite material as recited in claim 1 wherein said first layer includes a glass polymer composition, and said second layer includes a ceramic composition.

11. A method of fabricating a laminated composite material comprising the steps of:

(a) overlaying a first layer formed of a metal composition with a second layer formed of a ceramic composition to form a pre-laminate, said first layer being characterized by a first coefficient of thermal expansion and a first ductility parameter, said second layer being characterized by a second coefficient of thermal expansion and a second ductility parameter;

(b) heating said pre-laminate to a predetermined working temperature, said first and second ductility parameters being substantially equivalent in value at said predetermined working temperature;

(c) pressing together said first and second layers of said heated pre-laminate by applying thereto a predetermined compression force, said predetermined compression force being sufficient to cause said first and second layers of said heated pre-laminate to adhere one to the other and thereby form a core laminate;

(d) dividing said core laminate to delineate a plurality of substantially planar divided laminate portions, each of said divided laminate portions including a portion of said core laminate first layer and a portion of said core laminate second layer;

(e) substantially overlaying at least one of said divided laminate portions with another of said divided laminate portions to form a laminate stack;

(f) controlling the temperature of said laminate stack to maintain said substantial equivalence in value of said first and second ductility parameters of said core laminate first and second layer portions in each said divided laminate portion thereof; and, (g) pressing together said divided laminate portions of said heated laminate stack by applying thereto said predetermined compression force, whereby said divided laminate portions in said heated laminate stack are caused to adhere one to the other.

12. The method of fabricating a laminated composite material as recited in claim 4 wherein said core laminate is cut to form said plurality of divided laminate portions.

13. The method of fabricating a laminated composite material as recited in claim 11 wherein said core laminate is folded to form said plurality of divided laminate portions.

14. The method of fabricating a laminated composite material as recited in claim 11 wherein said second coefficient of thermal expansion is less than said first coefficient of thermal expansion.

15. A method of fabricating a laminated composite material comprising the steps of:

(a) overlaying a first layer formed of a metal composition with a second layer formed of a ceramic composition to form a pre-laminate, said first layer being characterized by a first coefficient of thermal expansion and a first ductility parameter, said second layer being characterized by a second coefficient of thermal expansion and a second ductility parameter;

(b) heating said pre-laminate to a predetermined working temperature, said first and second ductility parameters being substantially equivalent in value at said predetermined working temperature;

(c) pressing together said first and second layers of said heated pre-laminate by applying thereto a predetermined compression force, said predetermined compression force being sufficient to cause said first and second layers of said heated pre-laminate to adhere one to the other and thereby form a core laminate;

(d) folding said core laminate to form a plurality of divided laminate members arranged to form substantially a laminate stack;

(e) setting the temperature of said laminate stack to a predetermined compensated temperature, said first ductility parameter of said portion of said first layer contained in each said divided laminated member of said laminate stack being at said predetermined compensated temperature substantially equivalent in value to said second ductility parameter of said portion of said second layer contained therein; and, (f) pressing together said stacked divided laminate members of said laminate stack by applying thereto a predetermined compression force, whereby said stacked divided laminate members are caused to adhere one to the other.

16. The method of fabricating a laminated composite material as recited in claim 15 wherein said second coefficient of thermal expansion is less than said first coefficient of thermal expansion.

* * * * *